US008172974B2

(12) United States Patent
Kronzer

(10) Patent No.: US 8,172,974 B2
(45) Date of Patent: May 8, 2012

(54) HEAT TRANSFER METHODS OF APPLYING A COATED IMAGE ON A SUBSTRATE WHERE THE UNIMAGED AREAS ARE UNCOATED

(75) Inventor: Frank J. Kronzer, Woodstock, GA (US)

(73) Assignee: Neenah Paper, Inc., Alpharetta, GA (US)

( * ) Notice: Subject to any disclaimer, the term of this patent is extended or adjusted under 35 U.S.C. 154(b) by 878 days.

(21) Appl. No.: 11/923,795

(22) Filed: Oct. 25, 2007

(65) Prior Publication Data

US 2009/0110850 A1 Apr. 30, 2009

(51) Int. Cl.

| | |
|---|---|
| ***B29C 65/02*** | (2006.01) |
| ***B32B 37/14*** | (2006.01) |
| ***B32B 37/06*** | (2006.01) |
| ***B44C 1/165*** | (2006.01) |
| ***B44C 1/24*** | (2006.01) |
| *B29C 65/48* | (2006.01) |
| *B32B 37/12* | (2006.01) |
| *B32B 37/16* | (2006.01) |
| *B44C 1/17* | (2006.01) |

(52) U.S. Cl. ........ 156/239; 156/230; 156/234; 156/235; 156/247; 156/249

(58) Field of Classification Search .................. 156/230, 156/234, 235, 239, 247, 249

See application file for complete search history.

(56) References Cited

U.S. PATENT DOCUMENTS 3,922,445 A 11/1975 Mizuno et al.
4,006,267 A * 2/1977 Kurz et al. .................. 430/47.1
4,284,456 A * 8/1981 Hare ............................ 156/234
4,645,705 A * 2/1987 Abbott, Jr. ................ 428/195.1
4,785,313 A 11/1988 Higuma et al.
5,244,524 A * 9/1993 Yamane ........................ 156/230
5,407,729 A * 4/1995 Verden et al. ................ 428/196
5,501,902 A 3/1996 Kronzer (Continued)

FOREIGN PATENT DOCUMENTS

EP 1 136274 A2 9/2001

(Continued)

OTHER PUBLICATIONS

ASTM Designation: D 1238-95, "Standard Test Method for Flow Rates of Thermoplastics by Extrusion Plastometer", Nov. 10, 1995, pp. 273-281.

(Continued)

*Primary Examiner* — Sonya Mazumdar

(74) *Attorney, Agent, or Firm* — Dority & Manning, P.A.

(57) ABSTRACT

Methods and products for forming a coated image on a substrate are generally disclosed. The methods can include forming an image on a printable surface of a transfer coating layer of a printable transfer sheet. In a separate step, the negative mirror image of that same image is printed with toners on a toner printable sheet. After registering the sheets together, a portion of the transfer coating layer of the printable transfer sheet is transferred to the toner printable sheet, such that the portion of the transfer coating layer transferred to the toner printable sheet corresponds to the imaged areas on the toner printable sheet. However, the image formed on the printable surface of the transfer coating layer and the underlying transfer coating substantially remain on the printable transfer sheet. Thereafter, the image and the transfer coating layer remaining on the printable transfer sheet are transferred to a substrate.

13 Claims, 5 Drawing Sheets

U.S. PATENT DOCUMENTS

| | | | | |
|---|---|---|---|---|
| 5,798,179 | A | 8/1998 | Kronzer | |
| 6,277,229 | B1 | 8/2001 | Popat et al. | |
| 6,425,324 | B1 * | 7/2002 | Yamamoto | 101/34 |
| 6,506,445 | B2 | 1/2003 | Popat et al. | |
| 6,638,682 | B2 * | 10/2003 | Hare et al. | 430/256 |
| 6,849,370 | B2 | 2/2005 | Wagner et al. | |
| 6,871,950 | B2 | 3/2005 | Higuma et al. | |
| 7,238,410 | B2 | 7/2007 | Kronzer | |
| 7,361,247 | B2 | 4/2008 | Kronzer | |
| 7,364,636 | B2 | 4/2008 | Kronzer | |
| 7,470,343 | B2 | 12/2008 | Kronzer | |
| 7,604,856 | B2 | 10/2009 | Kronzer et al. | |
| 7,828,922 | B2 * | 11/2010 | Kronzer | 156/230 |
| 2005/0142307 | A1 | 6/2005 | Kronzer | |
| 2006/0019043 | A1 | 1/2006 | Kronzer | |
| 2006/0283540 | A1 * | 12/2006 | Kronzer | 156/235 |

FOREIGN PATENT DOCUMENTS

| | | | |
|---|---|---|---|
| EP | 1 136274 | A3 | 9/2001 |
| WO | WO 03066337 | A2 | 8/2003 |
| WO | WO 03066337 | A3 | 8/2003 |

OTHER PUBLICATIONS

ASTM Designation: E 28-99 (Reapproved 2004), “Standard Test Methods for Softening Point of Resins Derived from Naval Stores by Ring-and-Ball Apparatus”, Jun. 2004, pp. 1-6.

Search Report and Written Opinion for PCT/US2008/076359 dated Jan. 22, 2009, 15 pages.

Related U.S. Patent Application Form.

* cited by examiner

HEAT TRANSFER METHODS OF APPLYING A COATED IMAGE ON A SUBSTRATE WHERE THE UNIMAGED AREAS ARE UNCOATED

BACKGROUND OF THE INVENTION

In recent years, a significant industry has developed which involves the application of customer-selected designs, messages, illustrations, and the like (referred to collectively hereinafter as "images") on articles, such as T shirts, sweat shirts, leather goods, and the like. These images may be commercially available products tailored for a specific end-use and printed on a release or transfer paper, or the customer may generate the images on a heat transfer paper. The images are transferred to the article by means of heat and pressure, after which the release or transfer paper is removed. Generally, unless special inks are employed, images transferred to porous substrates, such as fabrics and leather, are supplemented with a transfer coating (transferable surface) which transfers with the inks, toners or other colorants. Such coatings are necessary or helpful to carry the image colorants into the porous substrates. Also, such coatings are necessary or helpful to adhere the colorants to the substrates and act as protection against wear.

Heat transfer papers having an enhanced receptivity for images made by wax-based crayons, thermal printer ribbons, ink-jet printers, laser-jet printers, and impact ribbon or dot-matrix printers, are well known in the art. Typically, a heat transfer material includes a cellulosic base sheet and an image-receptive coating on a surface of the base sheet. The image-receptive coating usually contains one or more film-forming polymeric binders, as well as, other additives to improve the transferability and printability of the coating. Other heat transfer materials include a cellulosic base sheet and an image-receptive coating, wherein the image-receptive coating is formed by melt extrusion or by laminating a film to the base sheet. The surface of the coating or film may then be roughened by, for example, passing the coated base sheet through an embossing roll.

Much effort has been directed at generally improving the transferability of an image-bearing laminate (coating) to a substrate. For example, an improved cold-peelable heat transfer material has been described in U.S. Pat. No. 5,798,179, which allows removal of the base sheet immediately after transfer of the image-bearing laminate ("hot peelable heat transfer material") or some time thereafter when the laminate has cooled ("cold peelable heat transfer material"). Moreover, additional effort has been directed to improving the crack resistance and washability of the transferred laminate. The transferred laminate must be able to withstand multiple wash cycles and normal "wear and tear" without cracking or fading.

Various techniques have been used in an attempt to improve the overall quality of the transferred laminate and the article containing the same. For example, plasticizers and coating additives have been added to coatings of heat transfer materials to improve the crack resistance and washability of image-bearing laminates on articles of clothing. Generally, it is possible to design such papers for use with specific substrates. For example, a heavier transfer coating is needed for a coarse, heavy fabric such as a sweatshirt fabric than for light fabrics such as silk or less porous substrates such as leather.

Heat transfer papers generally are sold in standard printer paper sizes, for example, 8.5 inches by 11 inches. Graphic images are produced on the transferable surface or coating of the heat transfer paper by any of a variety of means, for example, by ink-jet printer, laser-color copier, other toner-based printers and copiers, and so forth. The image and the transferable surface are then transferred to a substrate such as, for example, a cotton T-shirt. In most instances, transfer of the transfer coating to areas of the articles which have no image is necessary due to the nature of the papers and processes employed, but it is not helpful or desirable. This is because the transfer coatings can stiffen the substrates, make them less porous and make them less able to absorb moisture.

Thus, it is desirable that the transferable surface only transfer in those areas where there is a graphic image, reducing the overall area of the substrate that is coated with the transferable coating. Some papers have been developed that are "weedable", that is, portions of the transferable coating can be removed from the heat transfer paper prior to the transfer to the substrate. Weeding involves cutting around the printed areas and removing the coating from the extraneous non-printed areas. However, such weeding processes can be difficult to perform, especially around intricate graphic designs.

Therefore, there remains a need in the art for improved weedable heat transfer papers and methods of application. Desirably, the papers and methods provide good image appearance and durability.

SUMMARY OF THE INVENTION

In one embodiment, a method forming a coated image on a substrate is generally disclosed. The method can include forming an image on a printable surface of a transfer coating layer of a printable transfer sheet. In a separate step, a negative mirror image is printed with toners on a toner printable sheet. The negative mirror image on the toner printable sheet defines imaged areas having toner ink and unimaged areas that are substantially free of toner ink. Additionally, the negative mirror image substantially duplicates the image formed on the printable surface of the transfer coating layer of the printable transfer sheet in the unimaged areas of the toner printable sheet. A portion of the transfer coating layer of the printable transfer sheet is transferred to the toner printable sheet, such that the portion of the transfer coating layer transferred to the toner printable sheet corresponds to the imaged areas on the toner printable sheet. However, the image formed on the printable surface of the transfer coating layer substantially remains on the printable transfer sheet. Thereafter, the image and the transfer coating layer remaining on the printable transfer sheet is transferred to a substrate. Thus, the substrate having the coated image can be substantially free from the transfer coating layer in unimaged areas.

The portion of the transfer coating layer of the printable transfer sheet can be transferred to the toner printable sheet at a first transfer temperature of less than about 150° C. Then, the image and the transfer coating layer remaining on the printable transfer sheet can be transferred to the substrate at a second transfer temperature of greater than about 150° C.

In one embodiment, the transfer coating layer includes a powdered thermoplastic polymer and a film-forming binder. The transfer coating layer can also include a crosslinking agent.

In another embodiment, an intermediate imaged transfer sheet for use in heat transferring an image to a substrate is generally provided. The intermediate imaged transfer sheet includes a base layer, a release layer overlying the base layer, and a printable transfer coating overlying the release layer. An ink is present on the printable transfer coating to form an image. The printable transfer coating is only present on the intermediate imaged transfer sheet in areas where the ink is present.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
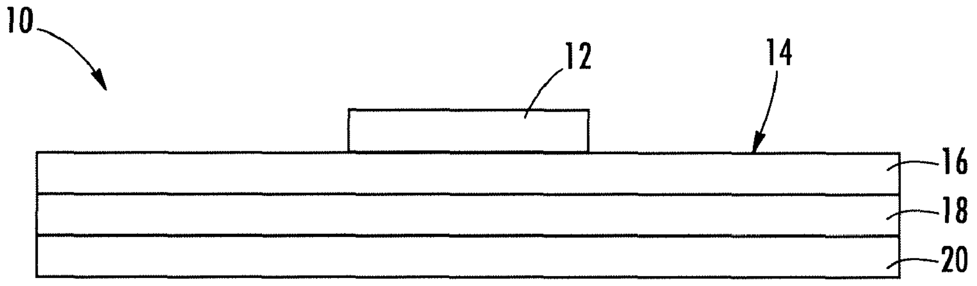
FIG. 1 shows a printable transfer sheet having an image defined on its printable surface.

Repeat use of reference characters in the present specification and drawings is intended to represent the same or analogous features or elements of the present invention.

DEFINITIONS

As used herein, the term "printable" is meant to include enabling the placement of an image on a material by any means, such as by direct and offset gravure printers, silk-screening, typewriters, laser printers, laser copiers, other toner-based printers and copiers, dot-matrix printers, and ink jet printers, by way of illustration. Moreover, the image composition may be any of the inks or other compositions typically used in printing processes.

The term "toner ink" is used herein to describe an ink adapted to be fused to the printable substrate with heat.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Detailed Description of Representative Embodiments

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to methods of making substrates having coated imaged areas on their surfaces surrounded by uncoated, unimaged areas. Specifically, the present disclosure is directed to methods of heat transferring an image to a substrate such that only the image is coated with the transfer coating layer, leaving the unimaged areas uncoated by the transfer coating layer. Thus, the methods disclose a weedable heat transfer method that can be easily performed by one of ordinary skill in the art without the need to cut around the printed areas to remove the coating from the extraneous, nonprinted areas.

Since no cutting or weeding is required, nearly anyone having a simple toner printer and a heat press can utilize the following methods to produce their own customized image for heat transfer to a substrate. Thus, many users that are not currently able to utilize heat transfer methods for applying an image to a substrate can now produce customized images on substrates with their own images.

I. Printing an Image on a Printable Transfer Sheet In order to produce a coated image on a substrate, an image is first applied (e.g., printed) onto a printable transfer sheet. The image printed onto the printable transfer sheet is a mirror image of the coated image which will be transferred to the final substrate. One of ordinary skill in the art would be able to produce and print such a mirror image, using any one of many commercially available software picture/design programs. Due to the vast availability of these printing processes, nearly every consumer easily can produce his or her own image to make a coated image on a substrate. Referring to FIG. 1, an exemplary printable transfer sheet 10 is shown having an ink 12 applied to its printable surface 14. In FIG. 1, an image is positively defined in the inked area of the printable surface 14, with the remainder of the surface area of the printable surface 14 being free of ink. As stated, the image defined by ink 12 is a mirror image of the desired coated image to be applied to the final substrate.

In a particular embodiment, the image can be digitally printed onto the printable transfer sheet via an ink-jet printer. Digital ink-jet printing is a well-known method of printing high quality images. Of course, any other printing method(s) can be utilized to print an image onto the printable sheet, including, but not limited to, flexographic printing, direct and offset gravure printers, silk-screening, typewriters, toner-based printers and copiers, dot-matrix printers, and the like. Typically, the composition of the ink will vary with the printing process utilized, as is well known in the art.

As shown in FIG. 1, the printable transfer sheet 10 includes a transfer coating layer 16, which overlays a release layer 18, which overlays a base layer 20. Thus, the transfer coating layer 16 defines an exterior layer of the printable transfer sheet 10 to define a printable surface 14. Although shown as two separate layers in FIG. 1, the release layer 18 can be incorporated within the base layer 20, so at they appear to be one layer having release properties.

As mentioned above, the transfer coating layer 16 overlays the base layer 20 and the release layer 18. The basis weight of the transfer coating generally may vary from about 2 to about 70 $g/m^2$. Desirably, the basis weight of the transfer coating may vary from about 20 to about 50 $g/m^2$, more desirably from about 25 to about 45 $g/m^2$, and even more desirably from about 25 to about 45 $g/m^2$. The transfer coating includes one or more coats or layers of a film-forming binder and a powdered thermoplastic polymer over the base layer and release layer. The composition of the coats or layers may be the same or may be different. Desirably, the transfer coating will include greater than about 10 percent by weight of the film-forming binder and less than about 90 percent by weight of the powdered thermoplastic polymer. In one particular embodiment, the transfer coating includes from about 40% to about 75% of the powdered thermoplastic polymer and from about 20% to about 50% of the film-forming binder (based on the dry weights), such as from about 50% to about 65% of the powdered thermoplastic polymer and from about 25% to about 40% of the film-forming binder.

In general, each of the film-forming binder and the powdered thermoplastic polymer can melt in a range of from about 65° C. to about 180° C. For example, each of the film-forming binder and powdered thermoplastic polymer may melt in a range of from about 80° C. to about 120° C. Manufacturers' published data regarding the melt behavior of film-forming binders or powdered thermoplastic polymers correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined, for example, by ASTM Test Method E-28, is useful in predicting their behavior in the present invention.

The molecular weight generally influences the melting point properties of the thermoplastic polymer, although the actual molecular weight of the thermoplastic polymer can vary with the melting point properties of the thermoplastic polymer. In one embodiment, the thermoplastic polymer can have an average molecular weight of about 1,000 to about 1,000,000. However, as one of ordinary skill in the art would recognize, other properties of the polymer can influence the melting point of the polymer, such as the degree of crosslinking, the degree of branched chains off the polymer backbone, the crystalline structure of the polymer when coated on the transfer sheet 16, etc.

The powdered thermoplastic polymer may be any thermoplastic polymer that meets the criteria set forth herein. For example, the powdered thermoplastic polymer may be a polyamide, polyester, ethylene-vinyl acetate copolymer, polyolefin, and so forth. In addition, the powdered thermoplastic polymer may consist of particles that are from about 2 to about 50 micrometers in diameter.

In general, any film-forming binder may be employed which meets the criteria specified herein. In some embodiments, water-dispersible ethylene-acrylic acid copolymers can be used.

Other additives may also be present in the transfer coating layer. For example, surfactants may be added to help disperse some of the ingredients, especially the powdered thermoplastic polymer. For instance, the surfactant(s) can be present in the transfer coating layer up to about 20%, such as from about 2% to about 15%. In one particular embodiment, a combination of at least two surfactants is present in the transfer coating layer. Exemplary surfactants can include nonionic surfactants, such as a nonionic surfactant having a hydrophilic polyethylene oxide group (on average it has 9.5 ethylene oxide units) and a hydrocarbon lipophilic or hydrophobic group (e.g., 4-(1,1,3,3-tetramethylbutyl)-phenyl), such as available commercially as Triton® X-100 from Rohm & Haas Co. of Philadelphia, Pa.

A plasticizer may be also included in the transfer coating layer. A plasticizer is an additive that generally increases the flexibility of the final product by lowering the glass transition temperature for the plastic (and thus making it softer). In one embodiment, the plasticizer can be present in the transfer coating layer up to about 40%, such as from about 10% to about 30%, by weight. One particularly suitable plasticizer is 1,4-cyclohexane dimethanol dibenzoate, such as the compound sold under the trade name Benzoflex 352 by Velsicol Chemical Corp. of Chicago. Likewise, viscosity modifiers can be present in the transfer coating layer. Viscosity modifiers are useful to control the rheology of the coatings in their application. Also, ink viscosity modifiers are useful for ink jet printable heat transfer coatings, as described in U.S. Pat. No. 5,501,902. A particularly suitable viscosity modifier for ink jet printable coatings is high molecular weight poly(ethylene oxide), such as the compound sold under the trade name Alkox R400 by Meisei Chemical Works, Ltd. The viscosity modifier can be included in any amount, such as up to about 5% by weight, such as about 1% to about 4% by weight.

The release layer 18 is generally included in the transfer coating layer 16 to facilitate the release of the unimaged transfer coating layer 16 of the printable surface 14 in the first transfer and then the imaged transfer coating layer 16 in the second transfer (as explained in greater detail below). The release layer 18 can be fabricated from a wide variety of materials well known in the art of making peelable labels, masking tapes, etc. In one embodiment, the release layer 18 has essentially no tack at transfer temperatures. As used herein, the phrase "having essentially no tack at transfer temperatures" means that the release layer 18 does not stick to the overlying transfer coating layer 16 to an extent sufficient to adversely affect the quality of the transfer. The thickness of the release coatings is not critical. In order to function correctly, the bonding between the transfer coating layer 16 and the release layer 18 should be such that about 0.01 to 0.3 pounds per inch of force is required to remove the transfer coating layer 16 from the base sheet 20 after transfer. If the force is too great, the transfer coating layer 16 or the base layer 20 may tear when it is removed, or it may stretch and distort. If it is too small, the transfer coating layer 16 may undesirably detach in processing.

The release layer may have a layer thickness, which varies considerably depending upon a number of factors including, but not limited to, the base sheet 20 to be coated, and the transfer coating layer 16 applied to it. Typically, the release layer has a thickness of less than about 2 mil (52 microns). More desirably, the release layer has a thickness of about 0.1 mil to about 1.0 mil. Even more desirably, the release layer has a thickness of about 0.2 mil to about 0.8 mil. The thickness of the release layer may also be described in terms of a basis weight. Desirably, the release coating layer has a basis weight of less than about 45 $g/m^2$, such as from about 2 to about 30 $g/m^2$.

Optionally, the printable transfer sheet 10 may further include a conformable layer (not shown) between the base layer 20 and the release layer 18 to facilitate the contact between the transfer coating layer 16 and the opposing surface contacted during heat transfer.

The base layer 20 can be any sheet material having sufficient strength for handling the coating of the additional layers, the transfer conditions, and the separation of the transfer coating layer 16 and opposing surface contacted during heat transfer. For example, the base layer 20 can be a film or cellulosic nonwoven web. The exact composition, thickness or weight of the base is not critical to the transfer process since the base layer 20 is discarded. Some examples of possible base layers 20 include cellulosic non-woven webs and polymeric films. A number of different types of paper are suitable for the present invention including, but not limited to, common litho label paper, bond paper, and latex saturated papers. Generally, a paper backing of about 4 mils thickness is suitable for most applications. For example, the paper may be the type used in familiar office printers or copiers, such as Neenah Paper's Avon White Classic Crest, 24 lb per 1300 sq ft.

The layers applied to the base layer 20 to form the printable transfer sheet 10 may be formed on a given layer by known coating techniques, such as by roll, blade, Meyer rod, and air-knife coating procedures. The resulting image transfer material then may be dried by means of, for example, steam-heated drums, air impingement, radiant heating, or some combination thereof.

II. Toner Printing the Negative Image on a Toner Printable Sheet

Figure 2:
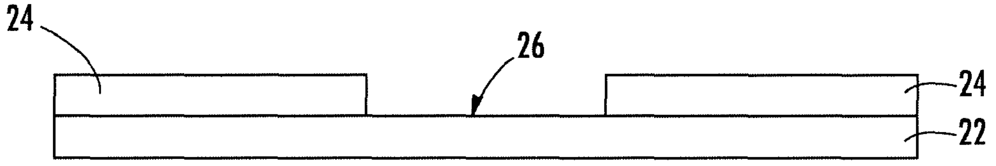
FIG. 2 represents a toner printable sheet having a toner image on its printable surface that is a negative mirror image of the image printed on the printable transfer sheet of FIG. 1.

In a separate step, the negative mirror image of the image applied to the printable surface 14 of the printable transfer sheet 10 is printed onto a toner printable sheet via a laser printer or a laser copier. For example, referring to FIG. 2, a toner printable sheet 22 is shown having the negative mirror image defined by the toner ink 24. The unimaged areas 26 define a negative image on the toner printable sheet 22 that is the mirrored negative of the image defined by the ink 12 on the printable surface 14 of the printable transfer sheet 10. One of ordinary skill in the art would be able to produce the negative mirror image though the use of any one of several commercially available software programs or copy machines.

Toner printable sheets are readily available commercially for use with laser printers and copiers. Generally, the toner printable sheet can be a cellulosic nonwoven web (e.g. paper). The exact composition, thickness or weight of the toner printable sheet is not critical to the transfer process since the toner printable sheet can be discarded after the first transfer step.

A number of different types of paper are suitable for the toner printable sheet including, but not limited to, common litho label paper, bond paper, and latex saturated papers. Generally, a paper of about 4 mils thickness is suitable for most applications. For example, the paper may be the type used in familiar office printers or copiers, such as Neenah Paper's Avon White Classic Crest, 24 lb per 1300 sq ft.

Figure 3:
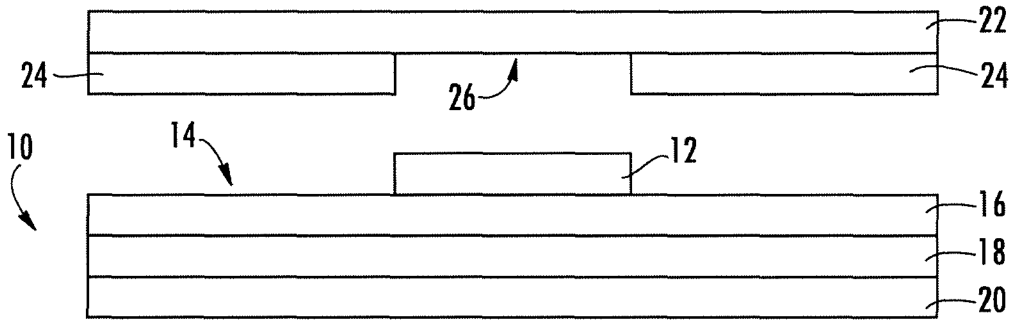
FIG. 3 represents the placement of the printable transfer sheet and the toner printable sheet such that the images are registered.

III. Removing Unprinted Portions of the Transfer Coating Layer From the Printable Transfer Sheet After applying an ink 12 onto the printable surface 14 of the printable transfer sheet 10, the portion of the transfer coating layer without any ink present is removed from the transfer sheet 10 by the negative mirror image on the toner printable sheet. In order to accomplish removal of the portion of the transfer coating layer without any ink present from the transfer sheet 10, the printable transfer sheet 10 and the toner printable sheet 22 are aligned in a registered manner. As used herein, the term "registered" means that the image defined by the ink 12 on the printable surface 14 of the printable transfer sheet 10 is substantially matched with the unimaged areas 26 on the toner printable sheet 22. For example, referring to FIG. 3, the printable transfer sheet 10 and the toner printable sheet 22 are aligned face to face (i.e., the printable surface 14 of the printable transfer sheet 10 contacts the surface having the toner ink 24 applied to the toner printable sheet 22) such that only the unimaged areas 26 of the toner printable sheet 22 contact the ink 12 on the printable surface 14 of the printable transfer sheet 10. Likewise, only the toner ink 24 defining the negative mirror image on the toner printable sheet 22 contacts the unimaged areas of the printable surface 14 of the printable transfer sheet 10. Of course, some minimal amount of overlap may occur without significantly affecting the remaining transfer steps, depending on the complexity of the image. For instance, less than about 5% of the surface area of the image defined by the ink 12 on the printable surface 14 of the printable transfer sheet 10 may contact the toner ink 24 on toner printable sheet 22, such as less than about 3%.

Figure 4:
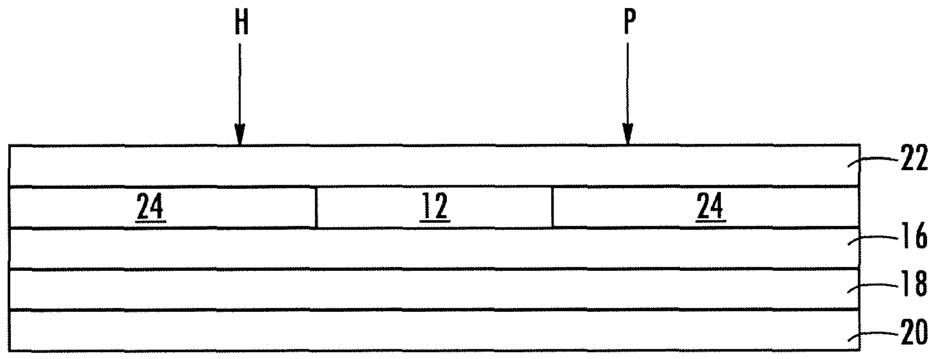
FIG. 4 represents the heat transfer step of the toner printable sheet and the printable transfer sheet.

Once registered and placed in contact with each other, heat H and pressure P are applied to the registered sheets forming a temporary laminate, such as shown in FIG. 4. The application of heat H and pressure P laminates the printable transfer sheet 10 and the toner printable sheet 22 together as a temporary laminate. When the printable transfer sheet 10 is separated (e.g., peeled apart) from the toner printable sheet 22, an intermediate imaged transfer sheet 28 and a coated toner printed sheet 30 are produced.

Figure 5:
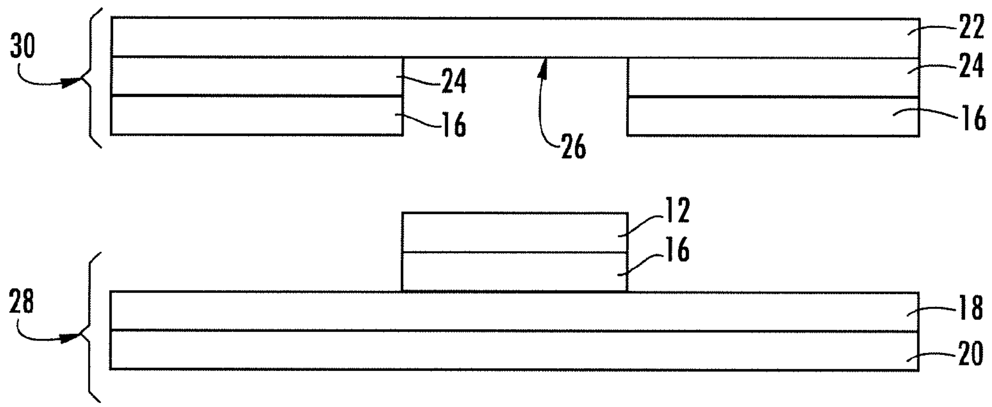
FIG. 5 represents the coated imaged transfer sheet and the coated toner printable sheet as a result of the separation of the layers shown in FIG. 4.

Referring to FIG. 5, the intermediate imaged transfer sheet 28 has the transfer coating layer 16 removed from the printable transfer sheet 10 only at areas where the toner ink 24 of the toner printable sheet 22 contacted the transfer coating layer 16. Thus, if registered correctly, the positive image applied to the printable transfer sheet 10 remains on the printable surface 14 of the transfer coating layer 16 surrounded by areas without any transfer coating layer 16 remaining. Likewise, the toner ink 24 on the toner printable sheet 22 is now coated with the transfer coating layer 16 from the printable transfer sheet 10 to form the coated toner printed sheet 30. The unimaged areas 26 of the toner printable sheet 22 are free of any coating. This coated toner printed sheet 30 may be discarded, as the usefulness of the toner printable sheet 22 has been completed (the excess transfer coating layer 16 has been removed from the unimaged areas of the printable transfer sheet 10).

The temperature required to form the temporary laminate and adhere the transfer coating layer 16 from the printable transfer sheet 10 to the inked areas defined by the toner ink 24 of the toner printable sheet 22 is generally below melting and/or softening point of the thermoplastic particles in the transfer coating layer 16.

For example, the transfer temperature (i.e., H) can be from about 50° C. to about 150° C., such as from about 80° C. to about 120° C. At this temperature, it is believed that the toner ink 24 softens and melts to become tacky, sufficiently adhering to the transfer coating layer 16 contacting the imaged areas of the toner printable sheet 22. Thus, after separation, the inked areas (i.e., the negative image defined by the toner ink 24) of the toner printable sheet 22 adheres to the transfer coating layer 16 of the printable transfer sheet 10, effectively removing these areas from the printable transfer sheet 10. On the other hand, the imaged areas of the transfer coating layer 16 (which do not contact the toner ink 24 when registered correctly) contact the unimaged areas 26 of the toner printable sheet 22 and are not adhered to the toner printable sheet 22. Thus, after separation, only the imaged areas of the transfer coating layer 16 remain on the printable transfer sheet 10 to form the intermediate imaged transfer sheet 28.

IV. Heat Transfer to Form a Coated Image on a Substrate

Figure 6:
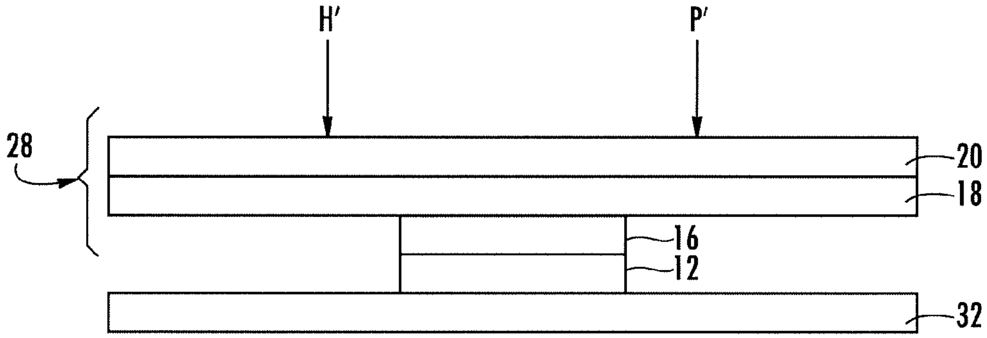
FIGS. 6 and 7 represent the heat transfer of the coated image transfer sheet to a substrate.
Figure 7:
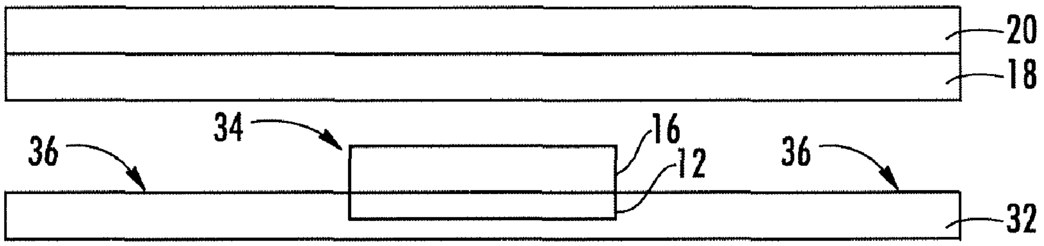
Figure 8:
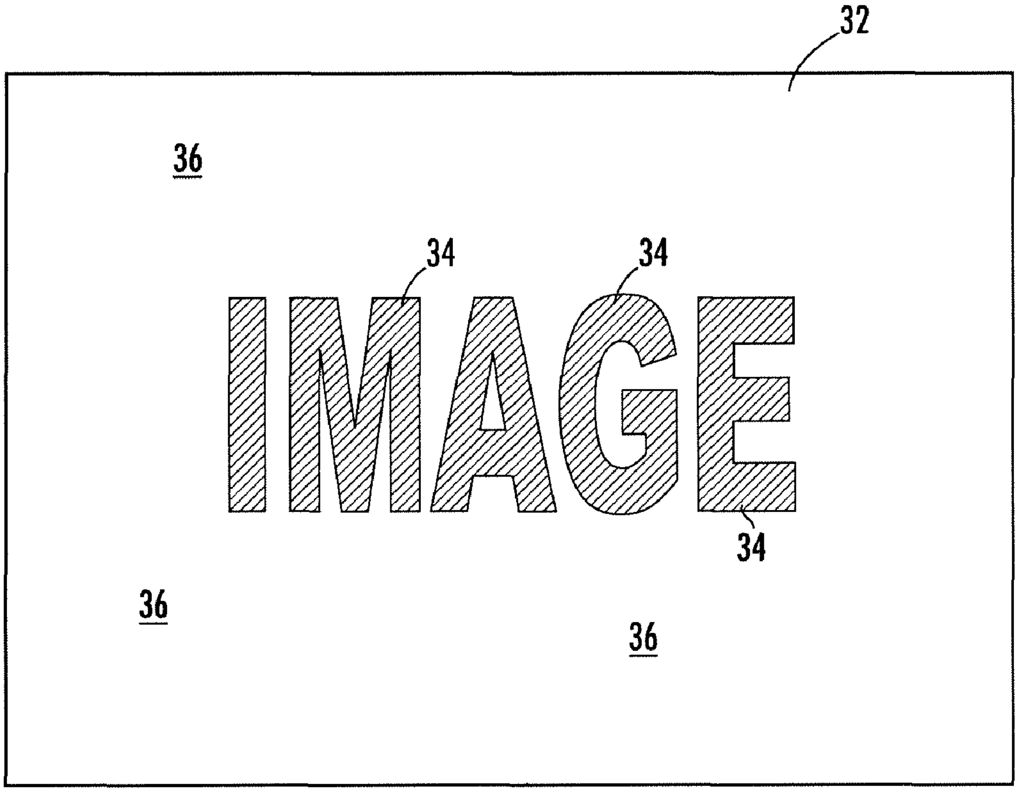
FIG. 8 represents the final substrate having the coated, imaged areas and the uncoated, unimaged areas.

The intermediate imaged transfer sheet 28 may now be utilized to apply a coated image onto a substrate. Referring to FIGS. 6 and 7, the intermediate imaged transfer sheet 28 is positioned adjacent to a substrate 32 such that the remaining transfer coating layer 16 having an image (defined by the ink 12) contacts the substrate 32. Heat transfer of the image is accomplished by applying heat H' and pressure P' to the intermediate imaged transfer sheet 28 at a second transfer temperature.

After separation (e.g., peeling the intermediate imaged transfer sheet 28 from the substrate 32), the substrate 32 has an image defined by the ink 12, as shown in FIG. 7. The transfer coating layer 16 is only present in the areas where the ink 12 is present, forming coated, imaged areas 34. The surrounding surface areas of the substrate 32 that are free of ink 12 remain uncoated, unimaged areas 36. Thus, no excess transfer coating layer 16 is applied to the substrate 32.

The transfer is performed at a temperature sufficient to soften and/or melt the remaining transfer coating layer 16 onto the substrate 32 substrate. In one embodiment, this second transfer can be conducted at a temperature greater than about 120° C., such as from about 150° C. to about 200° C.

The coated, imaged areas 34 can be applied to any substrate 32 (e.g., a porous substrate) using the methods of the present disclosure. Of course, the printable transfer sheet can be designed so as to be compatible with the particular substrate which one chooses to decorate. For example, a transfer designed for a coarse, heavy material will require a heavier coating than one designed for a very light material such as silk or a less porous material such as leather. In one particular embodiment, the substrate 32 is a cloth, such as used to make clothing (e.g., shirts, pants, etc.). The cloth can include any fibers suitable for use in making the woven cloth (e.g., cotton fibers, silk fibers, polyester fibers, nylon fibers, etc.). For example, the substrate can be a T-shirt that includes cotton fibers.

The present invention may be better understood with reference to the following examples.

EXAMPLES

The printable heat transfer paper had a 24 lb per 1300 square ft. cellulosic base sheet (Neenah Paper 24 lb. Classic Crest). An extruded layer of Elvax 3200, an Ethylene vinylacetate copolymer from Dupont, 1.8 mils thick was applied to serve as a heat conformable layer. The release coating was 2.5 lb. per ream, consisting of 100 dry parts Rhoplex SP 100 (Acrylic latex from Rohm and Haas) 5 dry parts of XAMA 7 (crosslinker from Bayer), 2 dry parts of Dow Corning Surfactant 190 and 5 dry parts of Carbowax polyethylene glycol 8000 (from Dow chemical Co.)

The transferable print coating weight was 7 lb. per 1300 square ft. and consisted of 100 dry parts Orgasol 3501 (polyamide particles from Arkema), 50 dry parts of Michem Prime 4983 (Ethylene acrylic acid copolymer from Michelman), 2 parts of ammonia, 8 parts of Triton X 100 (non-ionic surfactant from Dow chemical), 9 dry parts of APC M1 (polyamine from Advanced Polymer Inc.), 40 dry parts of powdered Benzoflex 352 (plasticizer from Velsicol) and 5 dry parts of polyox N 80 (polyethylene oxide from Dow Chemical).

The mirror image of a multicolored butterfly was printed onto the heat transfer paper described above using an Epson R 200 ink jet printer. Using computer software and a Canon 700 color copier, the butterfly image was converted into a black and white negative image (a negative image of the original butterfly or a negative mirror image of the image printed onto the transfer paper). This black and white negative was printed onto a toner printable sheet (80 lb. avalanche super smooth paper from Neenah paper) using a Canon 700 color copier. The printed heat transfer paper and the negative image printed paper were then aligned to register the images and heat pressed for 30 seconds at 220° F. (about 104° C.) in a T-shirt press. They were separated while still hot, resulting in the coating being transferred to the toner printable Avalanche paper only in the black negative imaged areas of the paper having the toner image. The transfer paper with the remaining butterfly mirror image and coating only under the imaged area was the pressed for 30 seconds at 350° F. (about 177° C.) against a piece of T shirt fabric in a heat press. The paper was removed after cooling, giving the fabric a coated image of the butterfly, with the coating only in the areas which contained the ink jet ink.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A method of forming a coated image on a substrate, the method comprising:

forming an image on a printable surface of a transfer coating layer of a printable transfer sheet;

printing a negative mirror image on a toner printable sheet, wherein the negative mirror image defines imaged areas having toner ink and unimaged areas that are substantially free of toner ink, wherein the negative mirror image substantially forms a mirror image of the image formed on the printable surface of the transfer coating layer of the printable transfer sheet in the unimaged areas of the toner printable sheet;

transferring a portion of the transfer coating layer of the printable transfer sheet to the toner printable sheet, wherein the portion of the transfer coating layer transferred to the printable transfer sheet corresponds to the imaged areas on the toner printable sheet such that the image and the underlying transfer coating of the printable transfer sheet substantially remains on the printable transfer sheet; and thereafter, transferring the image and the transfer coating layer remaining on the printable transfer sheet to the substrate.

2. A method as in claim 1, wherein the portion of the transfer coating layer of the printable transfer sheet is transferred to the toner printable sheet at a first transfer temperature of less than about 150° C.

3. A method as in claim 1, wherein the image and the transfer coating layer remaining on the printable transfer sheet is transferred to the substrate at a second transfer temperature of greater than about 150° C.

4. A method as in claim 1, wherein the transfer coating layer comprises a powdered thermoplastic polymer and a film-forming binder.

5. A method as in claim 4, wherein the transfer coating layer further comprises a viscosity modifier.

6. A method as in claim 1, wherein the negative mirror image is laser printed on the toner printable sheet by a laser printer or a laser copier.

7. A method as in claim 1, wherein the substrate having the coated image is substantially free from the transfer coating layer in unimaged areas.

8. A method of forming a coated image on a substrate such that unimaged areas of the substrate are substantially free from the coating, the method comprising:

applying an ink onto a printable surface of a transfer coating layer of a printable transfer sheet, wherein the ink defines an image on the printable surface;

printing a negative mirror image on a toner printable sheet, wherein the negative mirror image defines imaged areas having toner ink and unimaged areas that are free of toner ink, wherein the negative mirror image substantially forms the mirror image of the image applied to the printable surface of the transfer coating layer of the printable transfer sheet in the unimaged areas of the toner printable sheet;

registering and contacting the printable transfer sheet and the toner printable sheet, wherein the image on the printable surface of the transfer coating layer of the printable transfer sheet substantially contacts only unimaged areas of the toner printable sheet;

transferring a portion of the transfer coating layer of the printable transfer sheet to the toner printable sheet to form an intermediate imaged transfer sheet, wherein the portion of the transfer coating layer transferred to the printable transfer sheet substantially corresponds to the imaged areas on the toner printable sheet, and wherein the image applied to the transfer coating layer substantially remains on the intermediate imaged transfer sheet; and transferring the image and the transfer coating layer remaining on the intermediate imaged transfer sheet to the substrate.

9. A method as in claim 8, wherein the portion of the transfer coating layer of the printable transfer sheet is transferred to the toner printable sheet at a first transfer temperature of less than about 150° C.

10. A method as in claim 8, wherein the image and the transfer coating layer remaining on the printable transfer sheet is transferred to the substrate at a second transfer temperature of greater than about 150° C.

11. A method as in claim 8, wherein the transfer coating layer comprises a powdered thermoplastic polymer and a film-forming binder.

12. A method as in claim 11, wherein the transfer coating layer further comprises a viscosity modifier.

13. A method as in claim 8, wherein the negative image is laser printed on the toner printable sheet by a laser printer or a laser copier.

* * * * *